(12) United States Patent
Kwon

(10) Patent No.: US 6,394,134 B1
(45) Date of Patent: May 28, 2002

(54) CONTROL VALVE TRIM FOR HIGH-PRESSURE FLUID FLOW

(76) Inventor: Kab-Ju Kwon, 310-3 Kilchun-ri, Jangan-ri Hanjun-sataek 204-105, 619-950 (KR)

( * ) Notice: Subject to any disclaimer, the term of this patent is extended or adjusted under 35 U.S.C. 154(b) by 0 days.

(21) Appl. No.: 09/367,055

(22) PCT Filed: Jul. 2, 1999

(86) PCT No.: PCT/KR99/00352

§ 371 (c)(1),
(2), (4) Date: Aug. 6, 1999

(87) PCT Pub. No.: WO00/04426

PCT Pub. Date: Jan. 27, 2000

(30) Foreign Application Priority Data

Jul. 14, 1998 (KR) .......................................... 88-29178

(51) Int. Cl.[7] ................................................ F16K 3/24
(52) U.S. Cl. ............................. 137/625.3; 137/625.33; 138/42
(58) Field of Search ........................ 137/625.3, 625.33; 138/42

(56) References Cited

U.S. PATENT DOCUMENTS

| | | |
|---|---|---|
| 4,105,048 A | 8/1978 | Self |
| 4,407,327 A | 10/1983 | Hanson et al. |
| 4,567,915 A | 2/1986 | Bates et al. |
| 4,921,014 A | 5/1990 | Tartaglia et al. |
| 5,018,703 A | 5/1991 | Goode |
| 5,113,908 A | 5/1992 | Steinke |
| 5,618,025 A | 4/1997 | Barron et al. |
| 5,687,763 A | 11/1997 | Steinke |
| 5,732,738 A | 3/1998 | Graham |
| 5,819,803 A | 10/1998 | Lebo et al. |
| 6,039,076 A | * 3/2000 | Hemme et al. ........ 137/625.37 |

FOREIGN PATENT DOCUMENTS

| | | | |
|---|---|---|---|
| GB | 1569261 | * 6/1980 | .............. 137/625.3 |
| JP | 0184381 | * 10/1983 | .............. 137/625.3 |

* cited by examiner

*Primary Examiner*—John Fox
(74) *Attorney, Agent, or Firm*—Birch, Stewart, Kolasch & Birch, LLP

(57) ABSTRACT

Disclosed is a fluid flowing control device of a valve having fluid flowing paths which are made in more sophisticated configuration and by controlling the velocity of the fluid by the maximal use of available volume thereof, to thereby prevent to a maximal extent the generation of cavitation, flashing, blocking by foreign materials, and the damage of internal parts. The device includes a cage having an inside cylinder which is closely contacted with a plug, an outside cylinder which forms a plurality of holes in axial and radius directions, respectively, a first internal cylinder which forms a plurality of concave/convex grooves having rectangular sectional elbows with recess in an axial direction, a second internal cylinder which forms a plurality of holes in axial and radial directions, and upper and lower supporting plates for closely coupling the inside and outside cylinders with the first and second internal cylinders on the top and bottom ends thereof; the plug forming a sealing portion and an opening/closing portion which are in contact with a seat, on the leading end of the lower portion thereof, to thereby open/close the seat and control the fluid flow, while being moved in the inside of the cage; and the seat being in internal-contact with the plug.

12 Claims, 17 Drawing Sheets

CONTROL VALVE TRIM FOR HIGH-PRESSURE FLUID FLOW

This application is the national phase under 35 U.S.C. §371 of PCT International Application No. PCT/KR99/00352 which has an International filing date of Jul. 2, 1999, which designated the United States of America.

BACKGROUND OF THE INVENTION

1. Field of the Invention

The present invention relates to a mechanical technology used in the treatment for various kinds of fluids such as, for example, a compressive fluid, a non-compressive fluid and the like, and more particularly, to a fluid flowing control device comprising a valve having fluid flowing paths which are devised in a more sophisticated configuration by controlling fluid resistance, back pressure and overall operations and by controlling the velocity of fluid by the maximal use of available volume to thereby prevent the generation of cavitation, flashing, blocking by foreign materials, and the damage of internal parts.

The present invention is related to a fluid flowing resistor, a back pressure control part and can be applied to a multi-orifice type valve, a multi-path type valve, or any fluid flowing control device which is similar thereto.

2. The Prior Art

Conventionally, the devices, which are related to valves and resistors, are applied in a wide range of fields, in which some are commonly called a 'multi-path type valve'.

Specifically, a conventional multi-path type valve is applied in an ultimate situation or in a field where a high degree of precise control should be required.

Moreover, the velocity control for a fluid can be achieved in the multi-path type valve, and therefore, the valve can be applied in all devices where a long life period and a good quality of performance of the valve should be satisfied.

The conventional multi-path type valve can be applied in fields where noise and cavitation are controlled or in a high precision control field where hydraulic fluid or non-hydraulic fluid is adjusted. In addition, the valve is applied in various industrial fields containing thermal power generation, nuclear power generation, petrochemical production, refining and various chemical processes and so on.

A fluid flowing resistor of the conventional multi-path type valve, which is applied in the various fields as discussed above, is based upon a series of discs or cylinders which are stacked or overlapped over one another.

Each disc or cylinder has a plurality of separated paths and tortuous paths formed thereon, each of which is adapted to control pressure or an amount of fluid flow of the devices over the whole length of the valve. The details of devices concerning the above mentioned can be shown in U.S. Pat. Nos. 4,921,014, 4,567,915, 4,407,327 and 4,105,048.

As shown in the prior art, the fluid passing through the tortuous paths experiences velocity head loss.

The discharging velocity of the fluid is controlled so as to be decreased, such that the resistance created in the fluid flowing path under certain conditions reduces the cavitation, corrosion, abrasion, noise and vibration generated due to the high pressure of the fluid flow.

The conventional multi-path type of valve and fluid flow resistor are characterized in that the internal disc or cylinder forms a directional path and a winding turn type path therein.

A plug is adapted to move up and down on the inside of the conventional cage and has the leading end for opening/closing the fluid flowing paths of the fluid flowing resistor to adjust the overall flow of the fluid passing through the valve and for sealing the flow of the fluid, while being in contract with a seat.

In any case, for the purpose of performing the up and down movement of the plug in a stable manner and contacting the plug with the seat in a concentric axis, a labyrinth plug is used, which has a plurality of circumferential grooves on the lower portion of the plug.

In the conventional cage for utilizing as a valve, the size of the cage becomes bulky because of the small fluid flowing path and the simple tortuous path formation for generating the required amount of velocity head loss.

Moreover, this yields the following: a) the total size of the valve becomes large; b) the whole materials required for the valve are added; and c) the installation space of the valve is enlarged.

In addition, a vena contracta phenomenon caused by an orifice principle occurs in the vicinity of the sealing portion thereof or a clearance resulting in the cavitation, flashing, erosion/corrosion, noise and vibration caused due to velocity increment of fluid flow and decrement of the pressure on the fluid flowing resistor, plug, seat and the like.

In the same manner as the above, these phenomena occur even on the labyrinth plug.

On the other hand, since the cage comprises a plurality of fluid flowing paths having the sectional area so as to generate the desired amount of velocity head loss if foreign materials are inserted into the inlet of the valve, the paths of the cage or the inlet thereof are blocked which thereby deteriorates the inherent performance of the valve. Meanwhile, in the valve where the fluid passes through the cage from the lower portion of the plug, the sealing portion of the leading end of the plug, which is moved in an axial direction, is damaged due to the foreign materials blocking up the inlet of the path of the cage, to drastically deteriorate the sealing function of the valve.

In this case, so as to filter the foreign materials passing into the inlet of the valve, a separate screen is generally attached on the inlet for flowing the fluid to the valve.

DESCRIPTION OF THE INVENTION

An object of the present invention is to provide a fluid flowing control device comprising a valve which can be assembled and fabricated in an easy and simple manner, while retaining the characteristics of a cage of a multi-path type valve, and which can allow the fluid flowing resistor as a cage to restrict the insertion of foreign materials and form a predetermined space between a plug and the fluid flowing resistor, to thereby prevent the fluid flowing resistor from being blocked by the materials as well as to prevent the interaction of the foreign materials with the plug, without having a separate screen on the inlet for flowing the fluid in the valve.

Another object of the present invention is to provide a fluid flowing control device comprising a valve which can generate a large amount of velocity head loss on a plurality of fluid flowing paths to thereby increase a tortuous section per the fluid flowing path under the constant pressure drop, whereby the fluid flowing path is not blocked by the foreign materials passing through the valve to thereby increase an amount of the fluid flow within a predetermined volume thereof.

Still another object of the present invention is to provide a fluid flowing control device comprising a valve which can perform a structural separation and fluid dispersion in a device which interacts with the fluid flow to thereby prevent a vena contracta phenomenon in the vicinity of the fluid terminating stop position where a high pressure difference is generated, whereby cavitation, flashing, erosion/corrosion, noise and vibration can not be generated on a fluid flowing resistor, plug and seat.

To achieve these and other objects according to the present invention, a fluid flowing control device of a valve having a body comprising a fluid inlet and fluid outlet, a plug moved between the fluid inlet and the fluid outlet to control fluid flow, and a cage having a plurality of holes and grooves, the plug being closely attached and movable on the inside of the cage, which includes: the cage having an inside cylinder which is adapted to be closely contacted with the plug and defines a plurality of holes and protrusions in axial and radial directions, respectively; an outside cylinder which defines a plurality of holes in axial and radial directions respectively; a first internal cylinder which is overlapped and coupled between the inside and outside cylinders and forms a plurality of concave/convex grooves having rectangular sectional elbows with a recess in an axial direction and defining a plurality of holes therein, a second internal cylinder which is coupled with the first internal cylinder and defines a plurality of holes in axial and radial directions and upper and lower supporting plates for closely coupling the inside and outside cylinders with the first and second internal cylinders on the top and bottom ends thereof; the plug forming a sealing portion and an opening/closing portion which are each in contact with a seat, on the leading end of the lower portion thereof and a plurality of holes connected to the opening/closing portion through a groove on the top portion of the opening/closing portion, to thereby open/close the seat and control the fluid flow, while being moved in the inside of the cage; and the seat being in internal-contact with the plug.

BRIEF DESCRIPTION OF DRAWINGS

These and other advantages, features and objects of the present invention will become apparent from the following detailed description of the preferred embodiment of the present invention with reference to the accompanying drawings, in which.

BEST MODE FOR CARRYING OUT THE INVENTION

Figure 1:
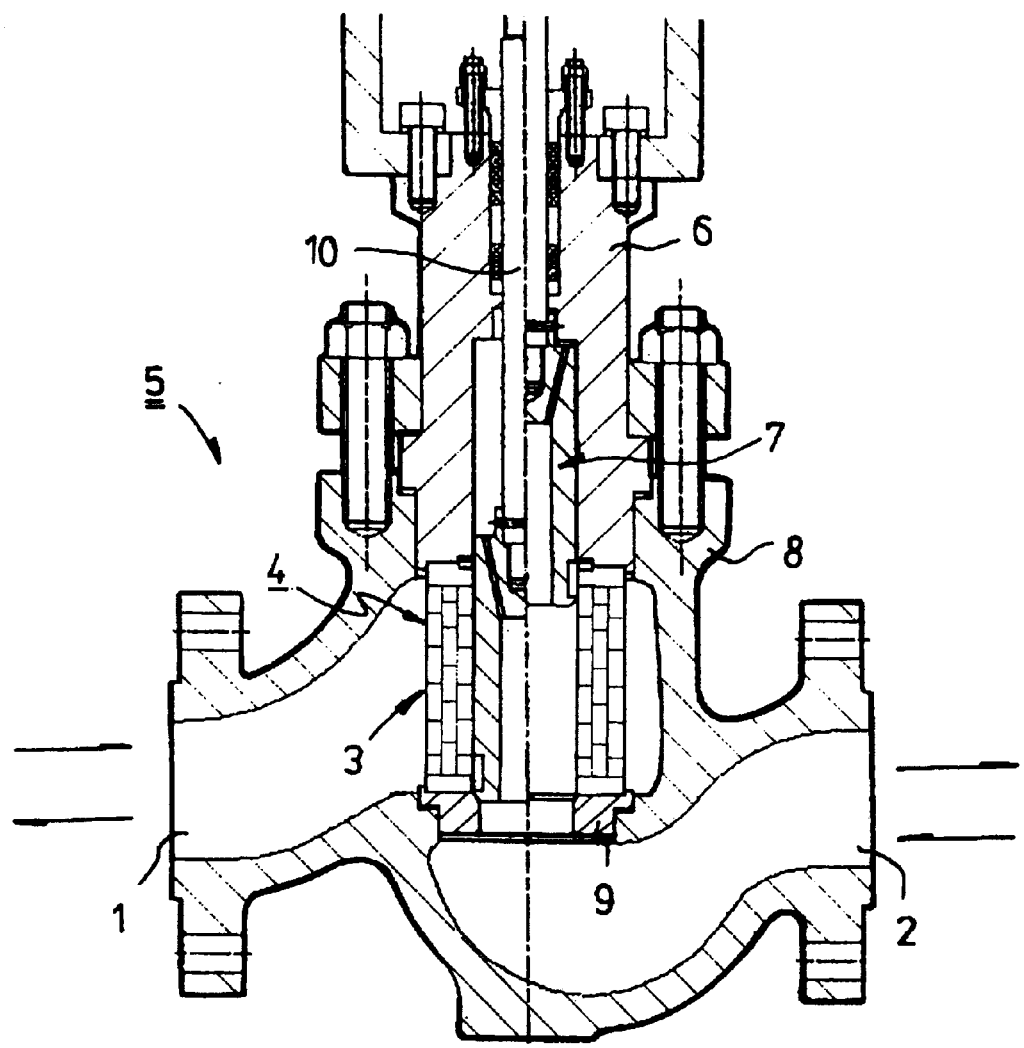
FIG. 1 is a partial sectional view illustrating a valve in which fluid flow is controlled according to a first embodiment of the present invention.

The fluid flowing resistor of the present invention is configured based upon a cylinder or a disc, and a resistant portion of each fluid flowing path which is constituted by combining orifice, rectangular section elbow with recess so as to produce a high amount of velocity head loss.

The rectangular section elbow of the present invention has different sectional area for the inlet or the outlet which is intended to generate a high amount of velocity head loss relative to the fluid flow.

The amount of pressure drop generated through the fluid flowing path is proportional to the loss coefficient, density of fluid and square of velocity which are determined upon the shape of fluid flowing path of the resistant portion and Reynolds number.

Since the amount of pressure drop is determined in accordance with the operational conditions of the valve, if the total velocity head loss is increased, the velocity of fluid can be effectively controlled in a smooth manner. The more the number of the resistant portions is increased by the fluid flowing path, the less the sectional area of the fluid flowing path is occupied, or the higher the loss coefficient of the resistant portion is, the greater the total amount of velocity head loss becomes.

Therefore, if the number of the resistant portions is increased and the sectional area of the fluid flowing path is reduced, an appropriate amount of fluid to be passed through the valve can not be obtained. To the contrary, if the sectional area of the fluid flowing path is increased, the size of the fluid flowing resistor is bulky, thus making it difficult to adjust the velocity of the fluid and cavitation.

Based upon the flow characteristic of the fluid, the present invention includes the resistant portion of each fluid flowing path which is designed to have a high loss coefficient, to thereby obtain a predetermined amount of pressure drop and velocity during the fluid flow, and is increased in number within a predetermined volume of the fluid flowing resistor, to thereby enlarge the section area of the fluid flowing path at the predetermined amount of pressure drop of the valve.

In accordance with the structural characteristics of the resistant portion, the cylindrical fluid flowing resistor of the present invention has the fluid flowing paths which are divided in the axial direction of the plug and has a clearance by the formation of orifices and rectangular section elbows with recess to control the fluid flow. This can avoid an additional operation for the mutual arrangement of the orifices and the elbows. Therefore, the present invention can produce and use a low-priced, but very precise valve, without having a conventional expensive multi-path type valve.

On the other hand, the disc type of fluid flowing resistor of the present invention has a pair of discs which are manufactured by combining orifices, rectangular section elbows and elbows with recess so as to increase a sectional area thereof relative to the flow direction of the fluid flowing path, so that the fluid flow is formed in radial and axial directions utilizing to a maximum extent of the available volume with the fluid flowing resistor.

Of course, the fluid flowing paths are formed through a plurality of discs, or the fluid flowing path similar thereto is formed through a single disc, in a radial direction thereof.

The fluid flowing resistor of the present invention can arrange the resistant portion and the sectional areas of the fluid flowing paths substantially different from each other, which can of course be combined and exchanged with each other.

The thickness of the cylinder or disc of the fluid flowing resistor and the size of the groove thereof are dependent upon the fluid conditions.

The thickness of the thinnest section of the resistor should be determined in a stable manner in respect of the structure or working, and the stability of the thickness thereof which is checked by a structural interpretation.

The fluid flowing resistor of the present invention has a plurality of holes, grooves or structural protrusions on the fluid inlet which are equal to or slightly less than the size of the fluid flowing path of the interior thereof and is adapted to substantially enlarge the sectional area of the fluid flowing path, thus to prevent the fluid flowing resistor from being blocked by the foreign materials within the fluid.

Preferably, a separation type of the plug according to the present invention has a sealing portion which is in contact with the seat and an opening/closing portion of the fluid flowing path of the fluid flowing resistor, for the purpose of performing the separating function and defines a plurality of grooves and holes on the surface of the upper portion of the opening/closing portion to generate pressure dispersion and back pressure by the fluid flow, thereby preventing the associated parts thereto from being damaged due to the fluid flow.

The structural separation of the plug can prevent the fluid flowing velocity from being high when the fluid flows between the lower portion of the plug and the seat.

In addition, the plug forms a fluid flowing path which traverses the groove of the circumferential direction and the opening/closing portion, on the surface of the upper portion of the opening/closing portion, and if the opening/closing portion forms a minute fluid flowing path under a high pressure difference, it disperses the fluid flow generated in the formed path or maintains the back pressure, so that the velocity of the fluid flow can not be high to thereby prevent the generation of the cavitation or the damage of the parts.

The present invention is applied for generating a velocity head loss in the cage which can be made by integrating the fluid flowing resistor with the seat and the function separation type plug, so that the minute fluid flowing can be controlled by an appropriate manner.

With the simple device in the sophisticated structure according to the present invention, the velocity head loss can be added and subtracted, achieving the fluid pressure dispersion, or maintaining the back pressure, whereby the increment of the fluid flowing velocity can be removed at a specific portion the cavitation and noise can be reduced, and a relatively large amount of fluid can flow.

Moreover, the valve of the present invention can be applied to an atmospheric resistor, flow valve, back pressure control valve, pressure reducer, pressure balancing or non-balancing valve, valve having a hard or soft seat and so on, for use in various kinds of fluids, and the separating type of function plug for sealing the fluid flow may be applied to a pressure relief valve, a safety valve or other types of valve, so that fluid overflow in the vicinity of the closing position of the sealing portion can be prevented to thereby avoid the damage of the associated parts.

Now, an explanation of the construction of a fluid flowing control device of a valve according to a first embodiment of the present invention will be in detail discussed with reference to FIG. 1.

FIG. 1 is a partial sectional view illustrating a valve in which fluid flow is controlled according to the present invention. A general valve 5 is comprised of bonnet 6, plug 7, a body 8, stem 10 where a predetermined control is necessary.

The present invention is directed to cage 3, plug 7 and seat 9, which are respectively installed on a fluid flowing path between a fluid inlet 1 and a fluid outlet 2, for controlling the fluid flow.

The valve 5 controls a predetermined amount of fluid flow in accordance with the position of the plug 7 relative to the cage 3 and the seat 9 and has a fluid flowing path from the fluid inlet 1 to the fluid outlet 2 and contrarily another fluid flowing path from the fluid outlet 2 to the fluid inlet 1.

The valve 5 couples the cage 3 as the fluid flowing resistor 4 and the seat 9 in the interior thereof and the plug 7 movable between the cage 3 and the seat 9 to open/close the fluid flowing path formed between the fluid inlet 1 and the fluid outlet 2, thereby controlling the fluid flow.

Typically, in this case, the cage 3 is in contact with the bonnet 6 on the seat 9.

The plug 7, which is disposed on the upper and lower centering line of the valve 5, is divided into left and right portions as shown in FIG. 1. The left portion of the plug 7 shows the case where the plug 7 is in contact with the seat 9 to completely close the fluid flow, and the right portion thereof shows the case where the plug 7 moves to the upper portion of the fluid flowing resistor 4 to open the fluid flow.

It is general knowledge that non-compressive fluid such as liquid fluid containing foreign materials flows over the plug 7 to thereby prevent the blocking of the cage 3 and the damage of the contact portion of the seat 9.

Compressive fluid containing vapour flows under the plug 7 to thereby exhibit various advantages according to the fluid characteristic.

The cage 3 of the present invention is preferably related to the fluid flowing resistor 4, which takes a cylinder or disc shape.

The valve 5 is configured so as to pass the fluid through the cage 3 and flow the fluid to the lower portion of the plug 7, and also constructed to pass from the lower portion of the plug 7 toward the cage 3. Even in case of the different fluid flowing directions, the applied resistance value applied when the fluid passes through the cage 3 is the same as each other.

Hereinafter, an explanation of the construction of the cage 3 as the cylindrical fluid flowing resistor 4 will be discussed with FIG. 2.

Figure 2:
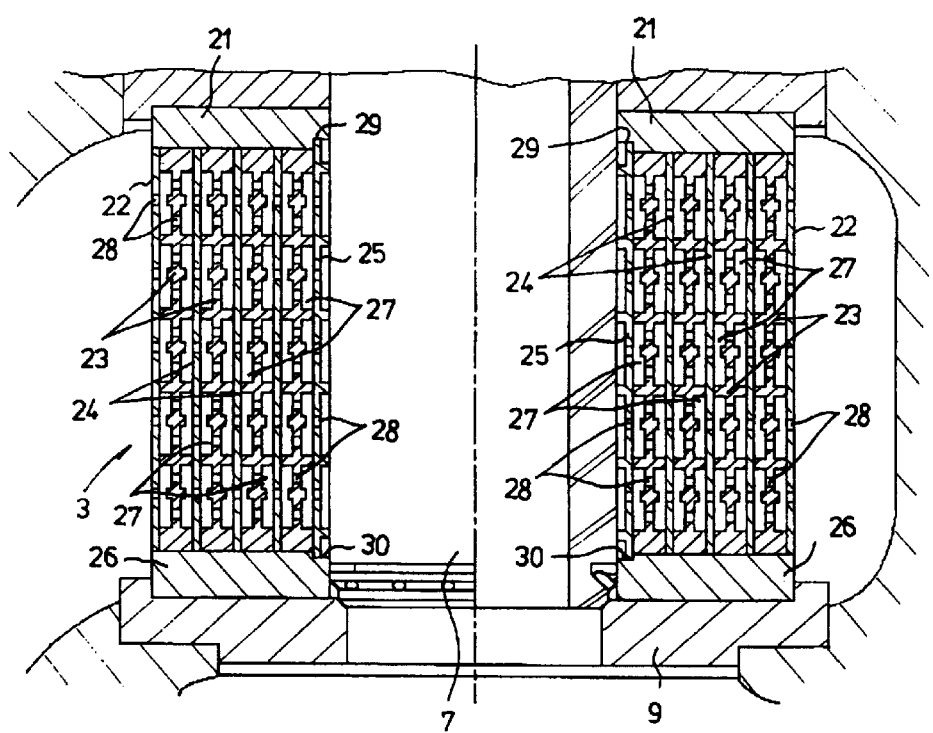
FIG. 2 is a partial section view illustrating the valve of FIG. 1, in which a cylindrical cage is installed.

FIG. 2 is a partial sectional view illustrating the valve of FIG. 1, in which the cylindrical cage 3 is assembled with the seat 9 and the plug 7.

The cylindrical cage 3 comprises an inside cylinder 25 surrounding the plug 7, an outside cylinder 22, first and second internal cylinders 23, 24 which are overlapped and installed between the inside and outside cylinders 25, 22, and upper and lower supporting plates 21, and 26 on the top and bottom ends of the cylinders 22, 23, 24, 25.

The terminating ends of the top and bottom portions of the inside cylinder 25 are closely coupled to circumferential protrusions 29, 30 of the disc shape of upper and lower supporting plates 21, 26.

The outside and inside cylinders 22, 25 and the first and second internal cylinders 23, 25 define a plurality of holes 28 thereon, in which the first internal cylinder 23 defines a plurality of grooves 27 having holes 28; and internal cylinder 24 defines a plurality of holes 28, which are overlapped and inserted between the outside and inside cylinders 22, 25.

Figure 4:
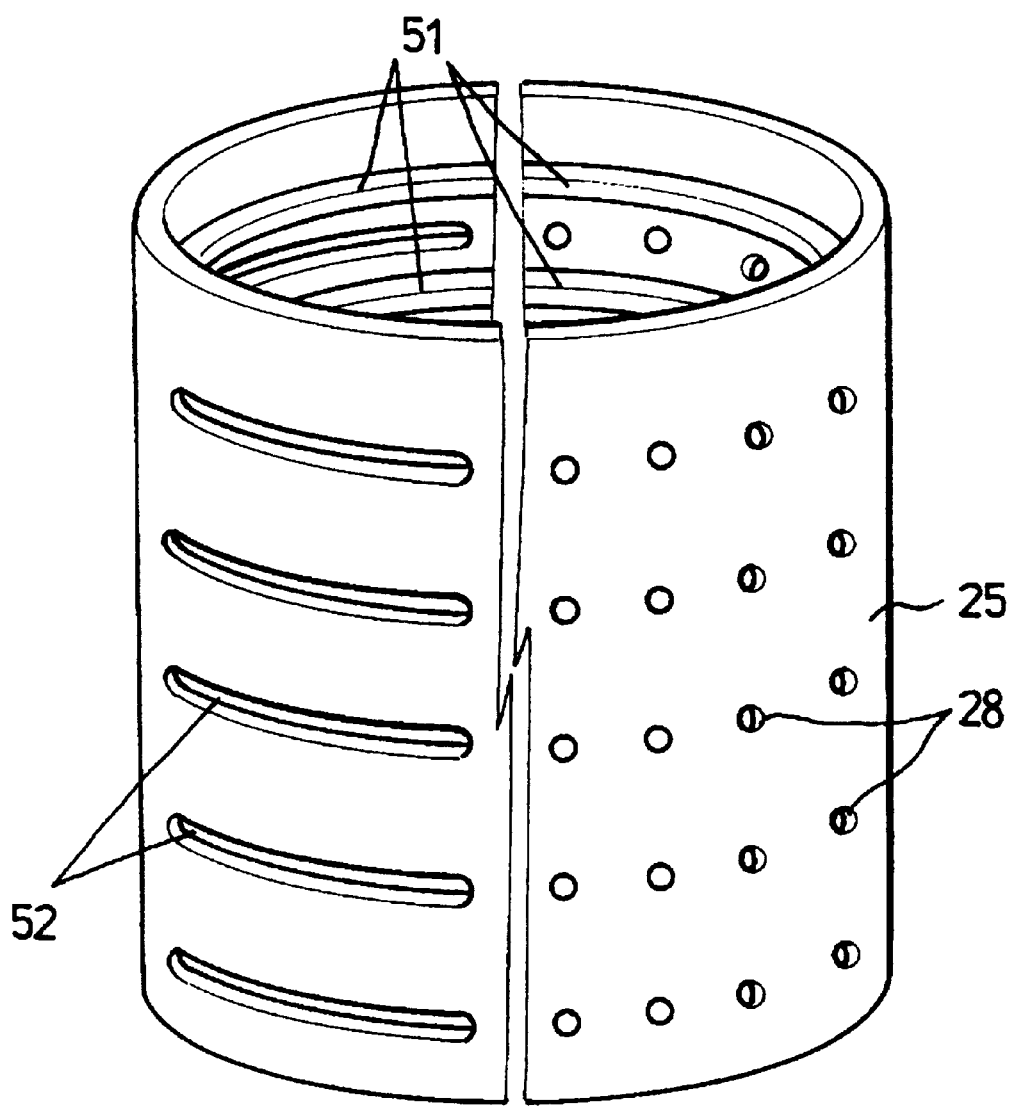
FIG. 4 is a perspective view illustrating an inside cylinder of the cage of FIG. 2.

The circular holes 28 on each of the cylinders 22, 23, 24, 25 may be replaced with longitudinal holes 52 or used together with the longitudinal holes 52, as shown in FIG. 4.

The grooves 27 of the first internal cylinder 23 are adapted to form a rectangular section elbow to flow the fluid in an axial direction or to help the fluid passing through the holes 28 to form or disperse the flow.

Figure 3:
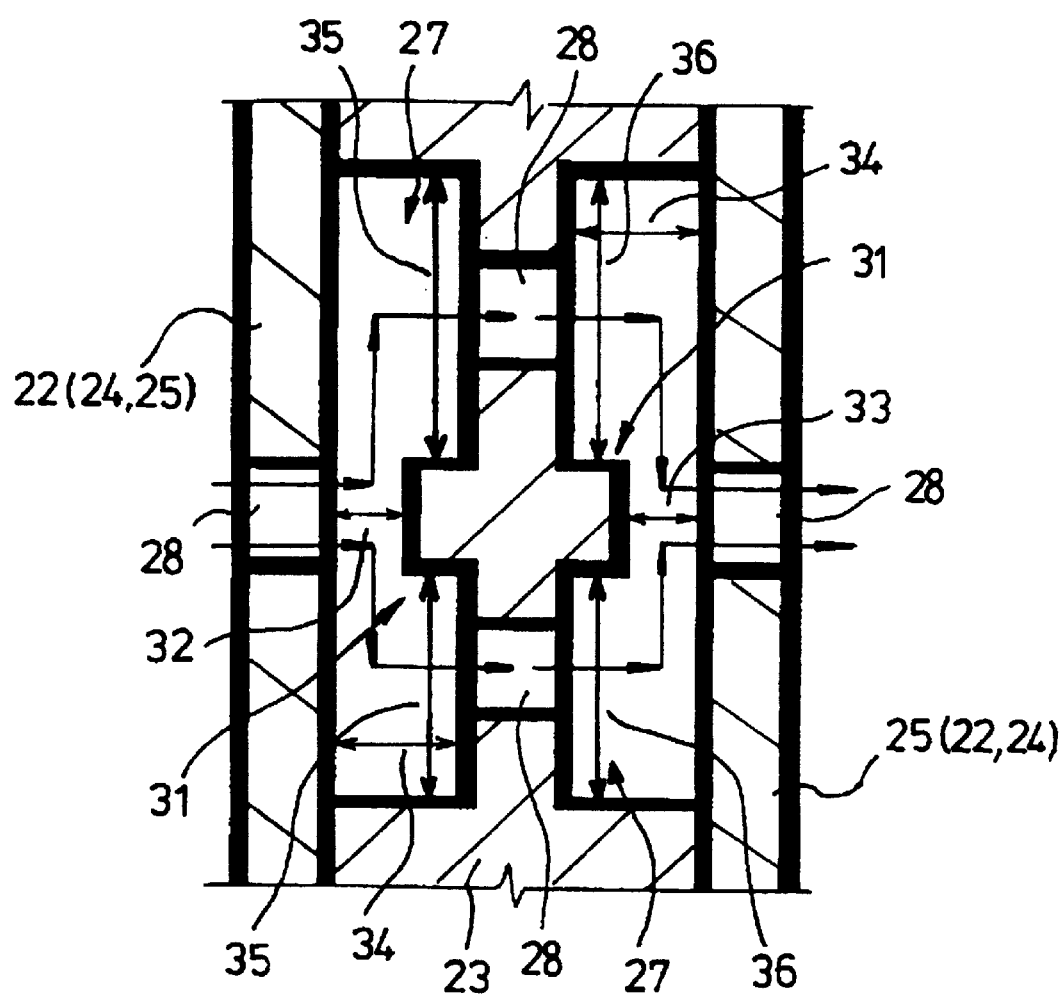
FIG. 3 is a partial sectional view illustrating the arrangement of the cage of FIG. 2.

Referring to FIG. 3, the size of each fluid flowing hole 28 on the outside and inside cylinders 22, 25 into which the fluid flows are designed to be smaller than or equal to the size of each fluid flowing hole 28 of other cylinders; and the distance 32, 33 between the side of the hole 28 and the groove 27, and the distance 34 of the rectangular section elbow 31 path, are thus designed preventing the fluid flowing within the cage 3 from being blocked by means of the foreign materials of the fluid.

The cylindrical material of the cage 3 can be manufactured in simple and rapid manner with a cutting process by means of a conventional machine tool such as a lathe, a milling machine, a drill machine and the like. A separate operation which is required for the arrangement of the fluid flowing paths, for example, in a multiple drilled hole cage, a hush trim, etc. can be omitted in the cylindrical cage 3 of the present invention.

On the other hand, the fluid flowing paths are divided in the axial direction and resistant portions are formed to generate a large amount of velocity head loss, so that a precise control capability for the fluid is obtained and the cavitation and noise can be prevented on high pressure conditions applied to the valve 5.

Figure 10:
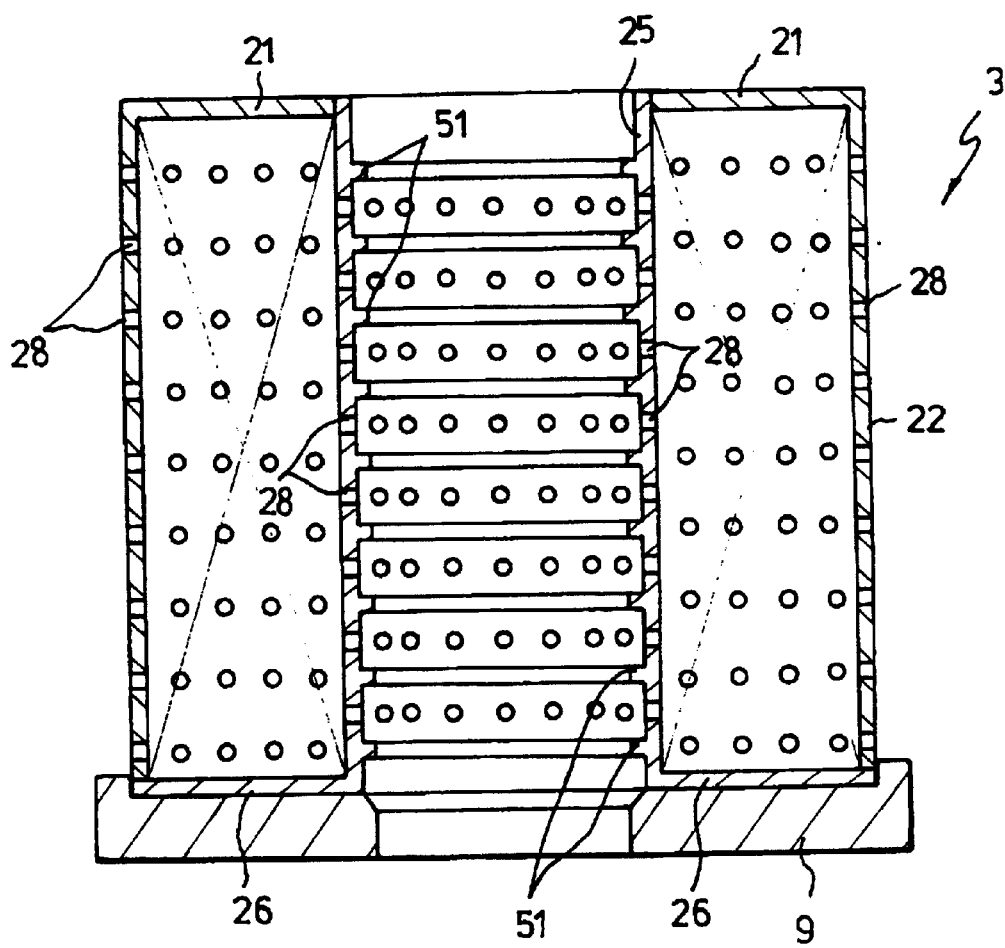
FIG. 10 is a sectional view illustrating the assembling state of the inside cylinder with the outside cylinder of the cage of FIG. 2.

The terminating ends of the upper and lower portions of each cylinder 22, 23, 24, 25 of the cage 3 are closely coupled with the circumferential protrusions 29, 30 of the disc shape of supporting plates 21, 26 or the outside cylinder 22 and the inside cylinder 25 as shown in FIG. 10, or alternatively, may be bonded therewith by means of braze welding or laser welding in accordance with the specific conditions of the valve 5.

FIG. 3 is a partial sectional view illustrating the arrangement of the cage 3 as the fluid flowing resistor 4 of FIG. 2, in which the fluid flows by means of the hole 28 and the groove 27. Now, an explanation of the flow characteristic at each resistant portion will be in detail given hereinafter.

The fluid, which passes through the cage 3, generated velocity head loss as it passes the hole 28.

The flow of fluid is divided by means of the rectangular section elbow (the perpendicular direction) 31, and at this time, the divided flows have newly changed by the fluid flow through the sectional areas of the distance 32 and 35. Whenever the flow of fluid is bent in the rectangular direction, velocity head loss occurs.

Thereafter, the fluid passes through each hole 28 of the first internal cylinder 23 and is then bent by means of the rectangular section elbow 31. Next, the fluid is bent in the rectangular direction on the inlet of the ejecting hole 28 and then passes through the hole 28.

Above all, the loss coefficient of the rectangular section elbow 31 has a relation to the sectional area of the fluid inlet (the sectional area of the fluid flowing direction in the distance 32 between the hole 28 and the rectangular section elbow 31 or the sectional area 36 of the fluid flowing direction before the fluid passes through the hole 28 of the groove 27, is dispersed and is bent in the perpendicular direction) and the sectional area of the fluid outlet (the rectangular sectional area of the distance 35 of the fluid flowing direction before the fluid passes through the hole 28 of the groove 27 or the sectional area of the fluid flowing direction in the distance 33 between the hole 28 and the rectangular section elbow 31). The less sectional area related to the outlet distance 33 comparing with the sectional area related to inlet distance 36, the more loss coefficient value of the rectangular section elbow 31 reveals exponentially.

Accordingly, when comparing with the arrangement where the same size of the inlet and outlet sectional areas of the rectangular section elbow 31 are repeatedly disposed, the arrangement under the present invention where the rectangular section elbow 31 having the outlet sectional area related to the distance 35 larger than the inlet sectional area thereof is firstly disposed and the rectangular section elbow 31 having the outlet sectional area related to the distance 33 smaller than the inlet sectional area thereof is then disposed, causes the total loss coefficient of the rectangular section elbow 31 to be increased drastically.

As discussed above, the sectional area of the fluid flowing path is enlarged under predetermined pressure drop conditions. This yields various advantages in overall valve structure.

FIG. 4 is a perspective view illustrating the inside cylinder 25 of the cage 3 which is in contact with the plug 7 of FIG. 2. The inside cylinder 25 forms a plurality of circumferential protrusions 51 on the inside surface thereof by a predetermined interval in axial and radial directions and a plurality of holes 28 between the protrusions 51, through which the fluid flows.

The plurality of circular holes 28 may be replaced with the longitudinal holes 52 or may be used together with the longitudinal holes 52.

The circumferential protrusions 51 function as the labyrinth parts, while being in contact with the plug 7.

In addition, if the contact area of the protrusions 51 with the plug 7 is small, the fluid flowing path can be smoothly opened/closed as the plug 7 moves in the axial direction.

Before the fluid flowing from each fluid flowing path of the cage 3 reaches the plug 7, the pressure of the fluid equalized in the space where the protrusions 51 are formed, which serves to eliminate the force generated in the radial directions which is applied to the plug 7.

In the case where the fluid flows to the cage 3 from the lower portion of the plug 7, the protrusions 51 at the lowermost end of the cage 3 function as a back pressure device which can prevent the generation of excessive pressure on the leading end of the lower portion of the plug 7 which is contacted with the cage 3.

The above functions of the protrusions 51 can prevent the damage on the contact portion of the lower end of the plug 7 with the cage 3.

In the same manner as the labyrinth plug, the plug 7 can perform the up and down movements under the fluid flowing conditions, and the plug 7 is in coaxial-contact with the seat 9. (FIG. 1)

The interval between the upper and lower portions of the circular holes 28 or the longitudinal holes 52 defines the fluid flowing path in the radial direction, in accordance with the position of the plug 7.

Figure 5:
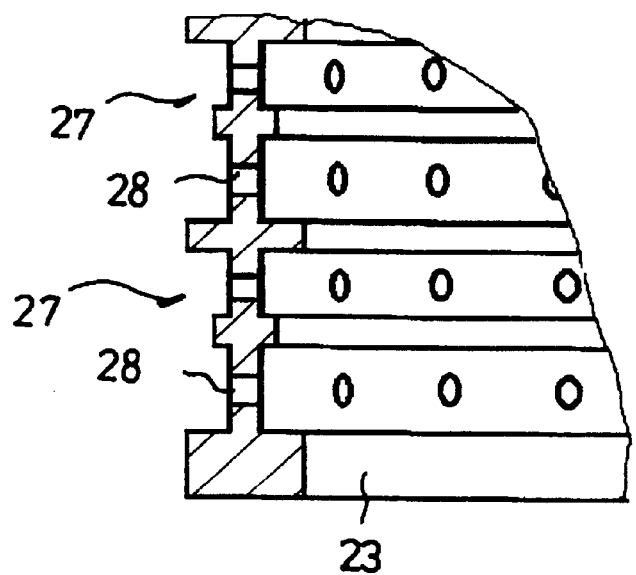
FIG. 5 is a partial sectional view illustrating an inside cylinder having concave/convex grooves of the cage of FIG. 2.

FIG. 5 is a sectional view illustrating the first internal cylinder of the cage 3. The first internal cylinder 23 defines the grooves 27 in the circumferential direction on the inside and outside surface thereof, for forming the rectangular section elbow 31, and defines the plurality of holes 28 by a predetermined interval on the grooves 27.

Of course, the plurality of circular holes 28 may be replaced with the longitudinal holes 52 as shown in FIG. 4 or may be used together with the longitudinal holes 52.

A concave and convex portion, which comprises the grooves 27 and the plurality of holes 28, defines the fluid flowing path in the radial and axial directions, in accordance with the position of the plug 7.

Figure 6:
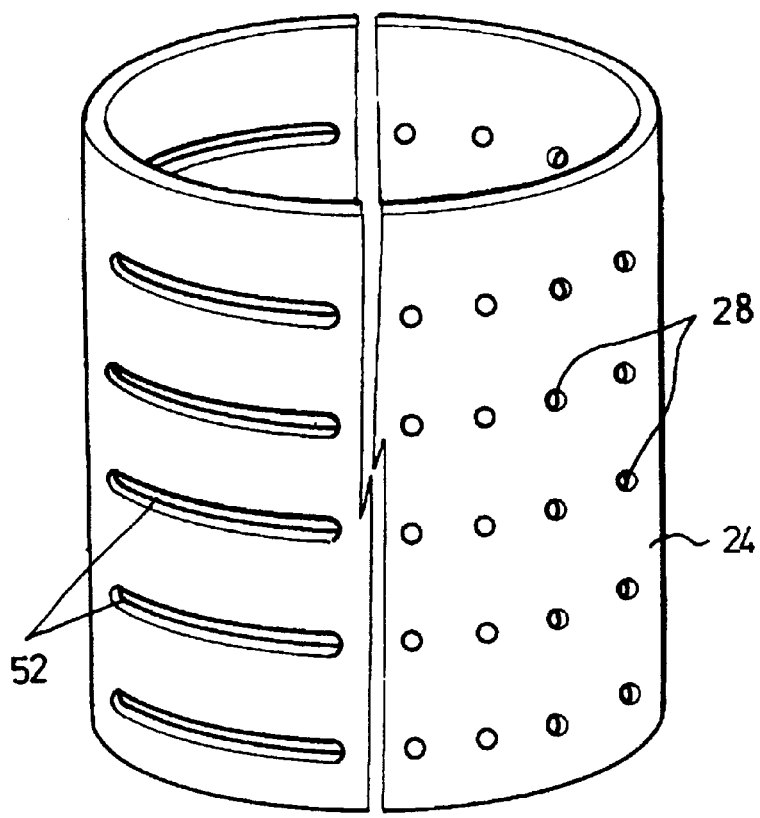
FIG. 6 is a perspective view illustrating an outside cylinder of the cage of FIG. 2.

FIG. 6 is a sectional view illustrating the second internal cylinder 24 of the cage 3. The second internal cylinder 23 defines the plurality of holes 28 by a predetermined interval, in the same manner as the inside cylinder 25. Of course, the plurality of circular holes 28 may be replaced with the longitudinal holes 52 as shown in FIG. 4 or may be used together with the longitudinal holes 52.

Figure 7:
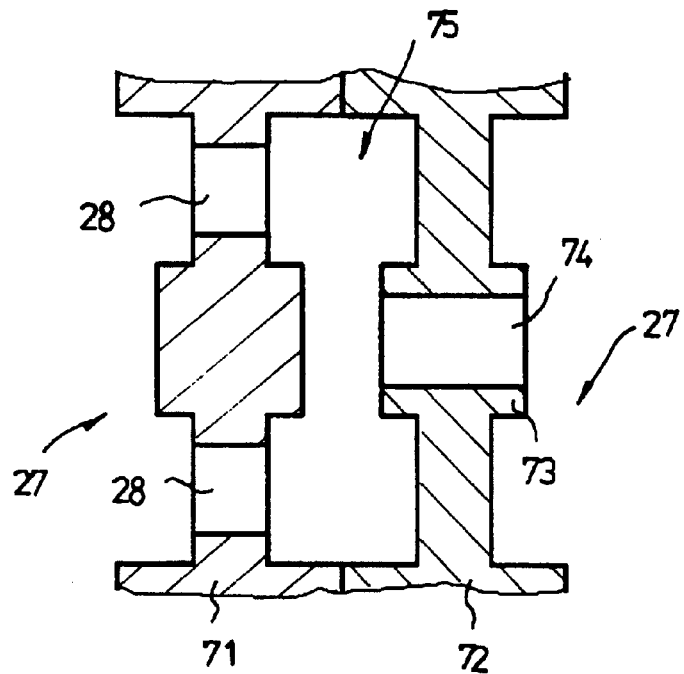
FIG. 7 is a partial sectional view illustrating one formation and arrangement of the inside cylinder of the cage of FIG. 2.
Figure 8:
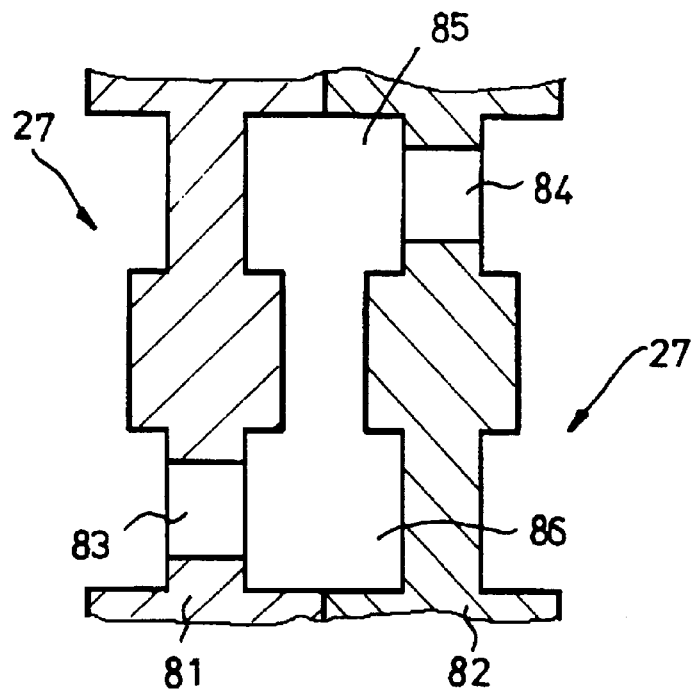
FIG. 8 is a partial sectional view illustrating another formation and arrangement of the inside cylinder of the cage of FIG. 2.
Figure 9:
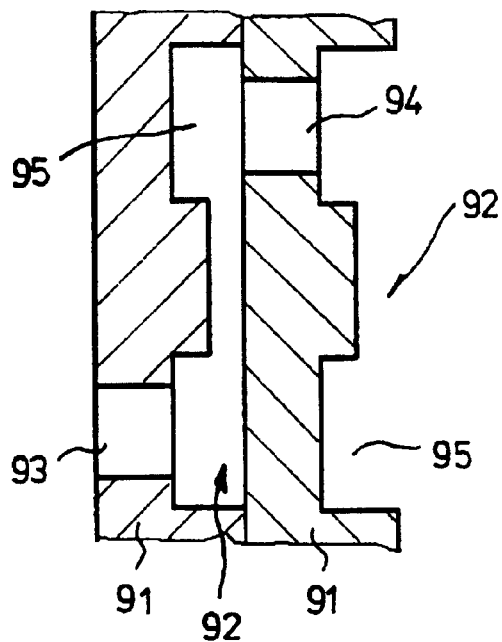
FIGS. 9 and 9a are partial sectional views illustrating yet another formation and arrangement of the inside cylinder of the cage of FIG. 2.

FIGS. 7 to 9 show various fluid flows formed only with the concave and convex groove type of cylinders, where the resistant portion is applied.

Firstly, one cylinder 71 as shown in FIG. 7 is the same as the first internal cylinder 23 of FIG. 5 and the other cylinder 72 defines a hole 74 on a convex portion 73 thereof. And, a concave portion 75 of the cylinder 72 serves as an elbow with recess in the fluid flow.

The circular hole 74 may be replaced with the longitudinal hole 52 as shown in FIG. 4 or may be used together with the longitudinal holes 52.

FIG. 8 is a partial sectional view illustrating the cage 3 in which only the cylinders with the groove 27 are arranged. The one cylinder 81 defines a hole 83 on the lower portion of the concave/convex groove 27, and the other cylinder 82 defines a hole 84 on the upper portion thereof.

The circular holes 83, 84 may be replaced with the longitudinal hole 52 as shown in FIG. 4 or may be used together with the longitudinal hole 52.

In this case, concave portions 85, 86 of the cylinders 81, 82 which has no hole or groove serve as an elbow with recess in the fluid flow.

Figure 9A:
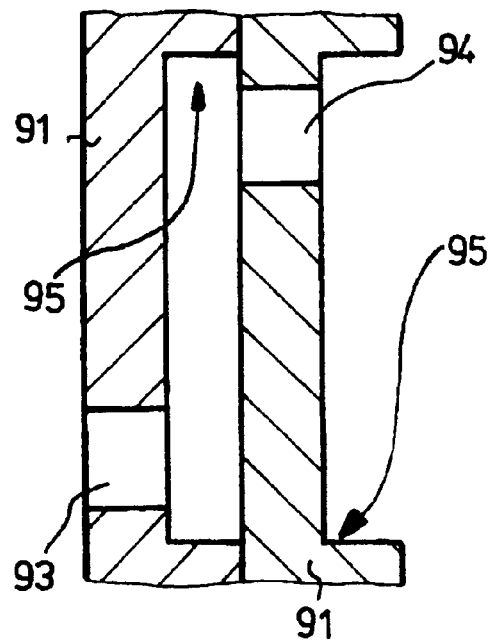

FIGS. 9 and 9a are partial sectional views illustrating the cage 3 in which a cylinder 91 with the groove 92 are arranged on the one surface thereof. Holes 93, 94 are crossedly formed within the groove 92 and a concave portion of the cylinder 91 which has no holes 93, 94 serves as an elbow with recess in the fluid flow.

FIG. 10 is a sectional view illustrating the assembling state of the inside cylinder 25 with the lower supporting plate 26 in the cage 3, as an integrated body with each other. Then, the outside cylinder 22 is formed as an integrated body with the upper supporting plate 21.

When the cage 3 operates with the plug 7, the protrusions 51, which provide a predetermined resistance as the back pressure control device for the fluid flow on the leading end of the lower portion of the plug 7, serve to the labyrinth part. Also, the protrusions 51 provide a round-shaped space between the plug 7 and the cage 3 to make the fluid flowing dispersion and the force applied to the plug 7 substantially uniform, to thereby prevent the interaction of the foreign materials with the plug 7.

The protrusion 51 may take a tapered shape having a predetermined angle or a rounded edge shape. If the protrusion 51 takes the tapered shape or the rounded edge shape, the contact area of the protrusion 51 with the plug 7 is small in the stable range of the structural interpretation, which allows the fluid flowing path to be smoothly switched in accordance with the movement of the plug 7 in the axial direction.

On the other hand, the lower supporting plate 26 combined with the inside cylinder 25 may be formed as an unitary body with the seat 9, or may be formed separately with the seat 9.

Figure 11:
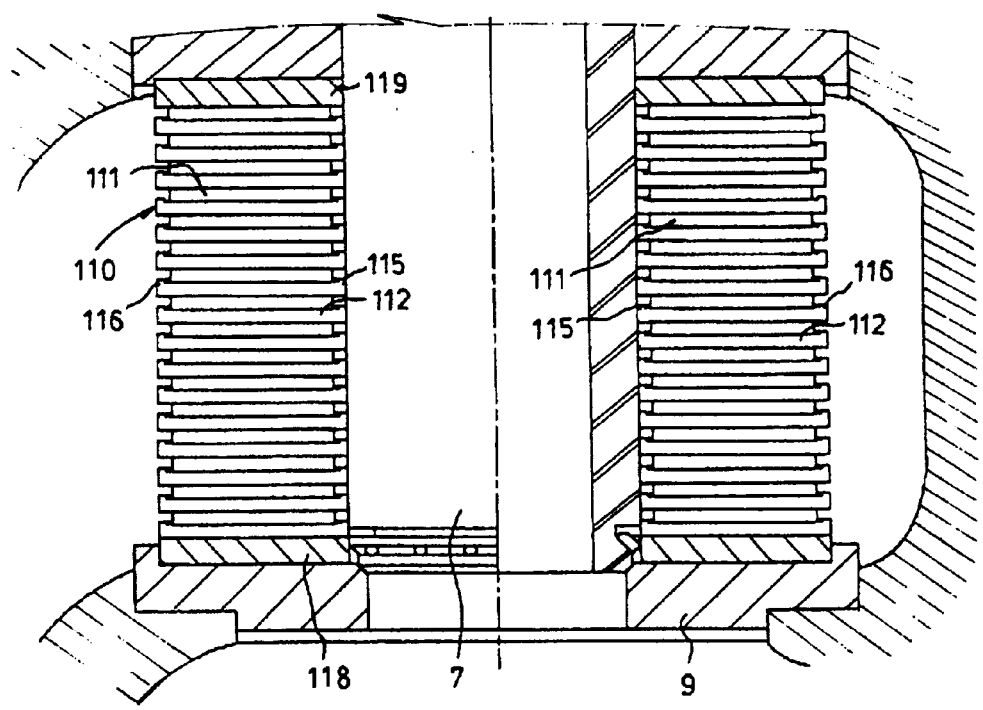
FIG. 11 is a sectional view illustrating a valve in which fluid flow is controlled according to a second embodiment of the present invention, in which a disc type column is installed.

FIG. 11 is a sectional view illustrating a valve in which flow for fluid is controlled according to a second embodiment of the present invention, in which a disc type column is installed. A fluid flowing resistor 110, which comprises upper and lower discs 111 and 112, surrounds the plug 7 and is disposed on the seat 9.

The cage 3 as shown in FIG. 2 comprises the cylinder and is replaced with the fluid flowing resistor 110, as shown in FIG. 11, and the discs 111 and 112 of the fluid flowing resistor 110 are stacked in the axial direction to form the disc column.

Figure 12:
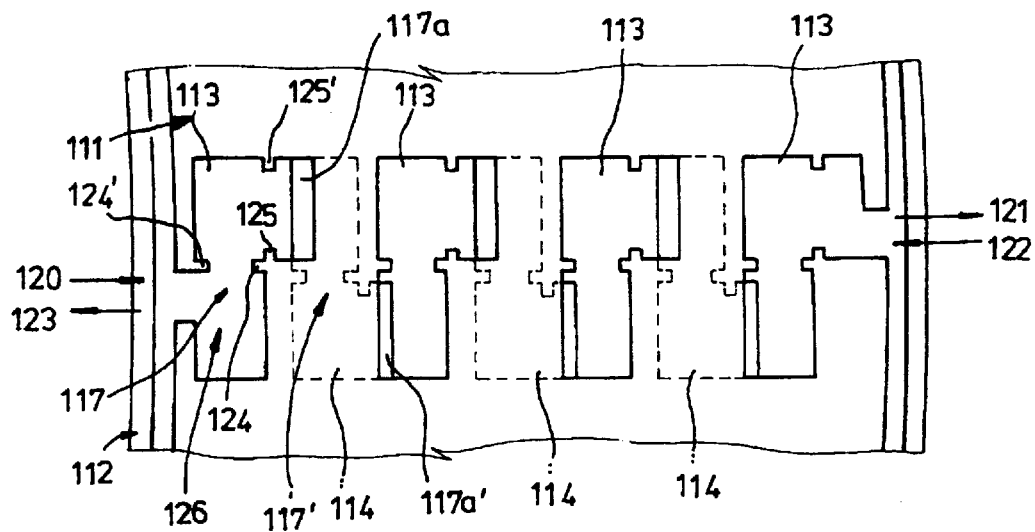
FIG. 12 is a partial plan view illustrating a pair of discs of the disc type column of FIG. 11.

In FIG. 12 a plurality of holes 113 and 114 angularly aligned with respect to the center of discs 111 and 112 and penetrated through both sides of them are partially overlapped up and down, through which the fluid flows.

In FIG. 11 protrusions 115 and 116 are formed on the inside and outside of the fluid flowing resistor 110 and serve to filter the foreign materials contained in the fluid to prevent the fluid flowing resistor 110 from being locked. By the formation of protrusions 115 and 116 of the lower disc 112, the gap into which the fluid flow passes is equal to, or less than the minimal sectional distance of each fluid flowing path.

The protrusions 115 serve as the labyrinth part and perform the pressure dispersion of the fluid and maintaining the back pressure in accordance with the flowing direction of the fluid.

FIG. 12 is a partial plan view illustrating a pair of discs 111 and 112 of the disc type column of FIG. 11, in which the fluid flows through the plurality of holes 113 and 114.

The holes 113 shown by the solid line are formed on the upper disc 111, and the holes 114 shown by the dotted line are formed on the lower disc 112.

The holes 113 and 114 are formed in such a manner that a rectangular section elbow 117 is repeatedly formed in the radial direction, and protrusions 124, 124' and 125, 125' are formed on the inside rectangular portion thereof to provide the orifice and elbow with recess functions.

The holes 113, 114 of the discs 111, 112 are formed in such a manner that each rectangular section elbow 117 has different inlet and outlet sectional areas.

The holes 113, 114 may be formed in an electric spark machining, laser machining and so on.

The pair of discs 111 and 112 are stacked to form the fluid flowing path, and upper and lower supporting plates 118, 119 are disposed on the both ends of the discs 111, 112, to obtain the disc type column as the fluid flowing resistor 110 as shown in FIG. 11.

The discs 111, 112 are stacked in such a manner that they form a plurality of holes in an axial direction thereon and are fixed by means of a bolt or a pin through the holes or they are bonded in braze welding or laser welding.

The fluid flowing path may be formed from the arrow 120 shown in FIG. 12 of the disc inside to the disc outside of the arrow 121, or from the arrow 122 of the disc outside to the disc inside of the arrow 123.

Referring to the resistance operation to the fluid flowing path, velocity head loss is generated at the fluid inlet 120 on which the fluid flow is reduced, and is then generated as the fluid flow is bent through the rectangular section elbow 117 disposed in the opposite direction of the recess 126.

Thereafter, the velocity head loss is generated by a combined flow resistance on the orifice and elbow with recess 124, 124' and 125, 125' of the rectangular section elbow 117 having different fluid flowing inlet and outlet sectional areas thereof.

Next, the fluid flow is bent twice through a rectangular section elbow 117a disposed between the upper, lower disc 111 and 112 and is dispersed as a labyrinth part, and is then bent twice through a rectangular section elbow 117' on the lower disc 112. Thereafter, the fluid flow is bent twice through a rectangular section elbow 117a' and is dispersed as a labyrinth part. Every stage as mentioned above the velocity head loss is generated through the fluid flow in the radial and axial directions from the upper disc 111 to the lower disc 112.

In other words, in the case of the pair of discs 111, 112, for example, each hole 113, 114 forms into a module and the direction of the fluid flow in the module is changed eight times.

As set forth in the cylindrical cage 3 of the first embodiment of the present invention, the total loss coefficient increases by applying the orifice, the elbow with recess and the labyrinth part as a combined manner concerning the rectangular section elbow having the different inlet and outlet sectional areas, and the sectional area of the fluid flowing path under predetermined pressure drop conditions. This provides various advantages in the structure of the overall valve 5 structure seen in FIG. 1.

Moreover, in this case where the fluid flowing paths 117a, 117a' of the upper and lower discs 111, 112 are formed crossly with different widths in a circumferential direction, the sectional area of the fluid flowing path between the upper and lower discs 111, 112 is reduced thus to achieve a high labyrinth effect, which results in the increment of the velocity head loss.

Such arrangement is required to produce the desired pressure drop and fluid velocity under specific flowing conditions.

Figure 13:
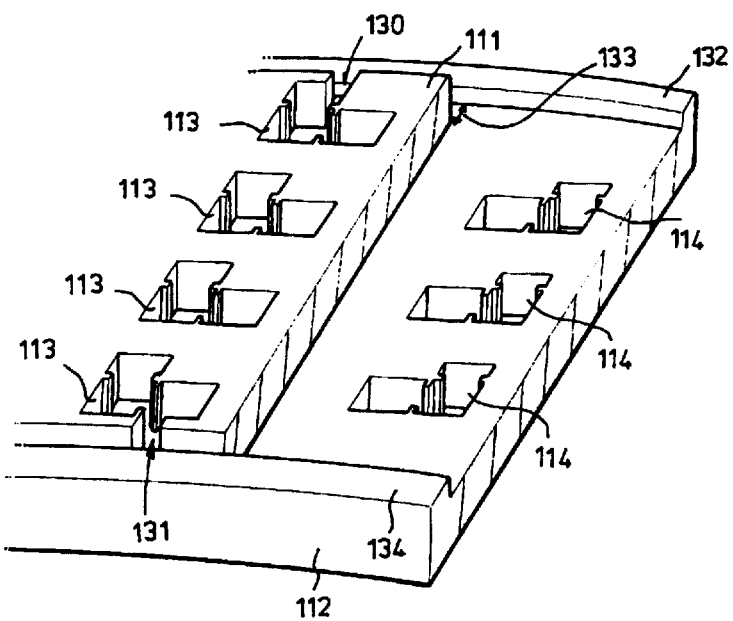
FIG. 13 is a partial perspective view illustrating the pair of discs of FIG. 11.

FIG. 13 is a perspective view illustrating the pair of discs 111, 112, in which the fluid flows from the outside of the disc to the inside of the disc. An inlet 130 and an outlet 131 for the fluid flowing path are formed only on the upper disc 111.

Of course, the inlet may be formed on the disc 111 and the outlet on the other disc 112.

In addition, a protrusion 132 is formed on the lower disc 112 to prevent the fluid flowing path from being blocked by means of foreign materials and a predetermined height in such a manner that the gap between lower discs 112 is lower than a minimum sectional length of the fluid flowing paths.

The interval between the protrusion 132 of the lower disc 112 and the groove 133 formed by the size of the upper disc 111 is formed to be equal to or shorter than a minimum sectional length of the fluid flowing paths of the upper and lower discs 111 and 112.

If the fluid flows from the disc inside to the disc outside, the formation of the protrusion 132 and the groove 133 on the disc outside is not needed.

Figure 15:
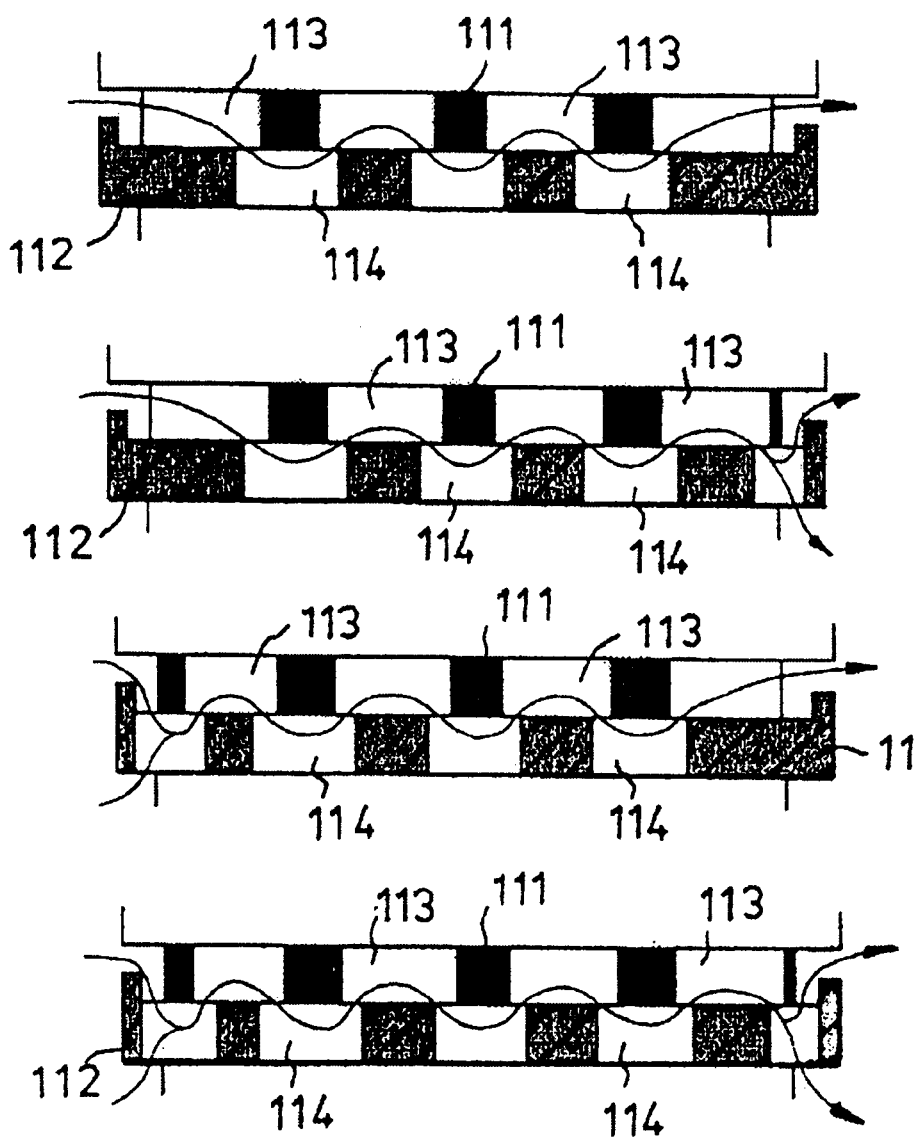
FIGS. 15, 15a, and 15b are partial sectional and side views illustrating the pair of discs of the disc type column of FIG. 11.
Figure 15A:
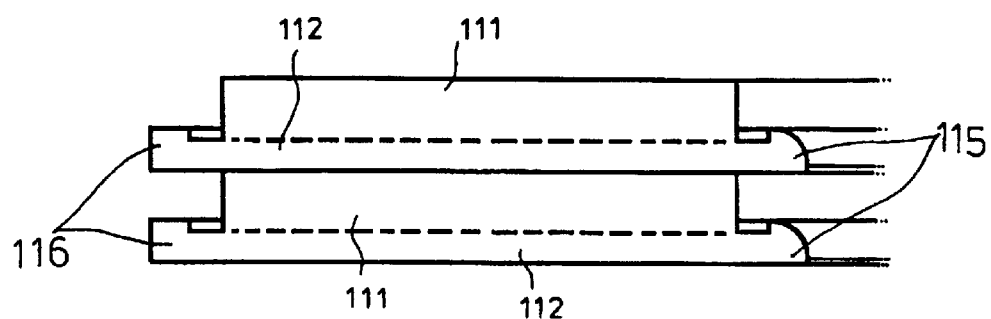
Figure 15B:
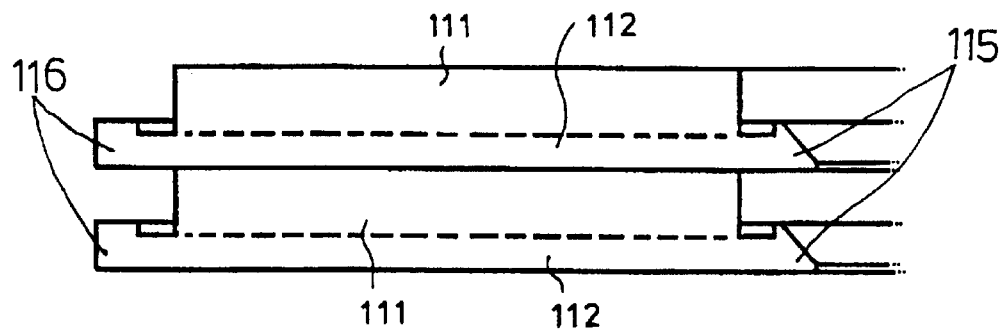

A protrusion 134 on the lower disc 112 forms an edge as shown in FIGS. 15a and 15b for reducing the contact area with the plug 7, to smoothly open/close the fluid flowing path in accordance with the movement of the plug 7, and it disperses the fluid flow, removing the force in the radial direction applied to the plug 7. Furthermore, the protrusion 134 is in contact with the plug 7, thus serving as the labyrinth part, whereby the fluid can flow in linear and smooth manner in accordance with the movement of the plug 7.

In this case, if the fluid flows from the disc inside to the disc outside, the protrusion 134 forms a round-shaped space in the vicinity of the plug 7, and prevent the interaction of the plug 7 with the foreign materials.

Figure 14:
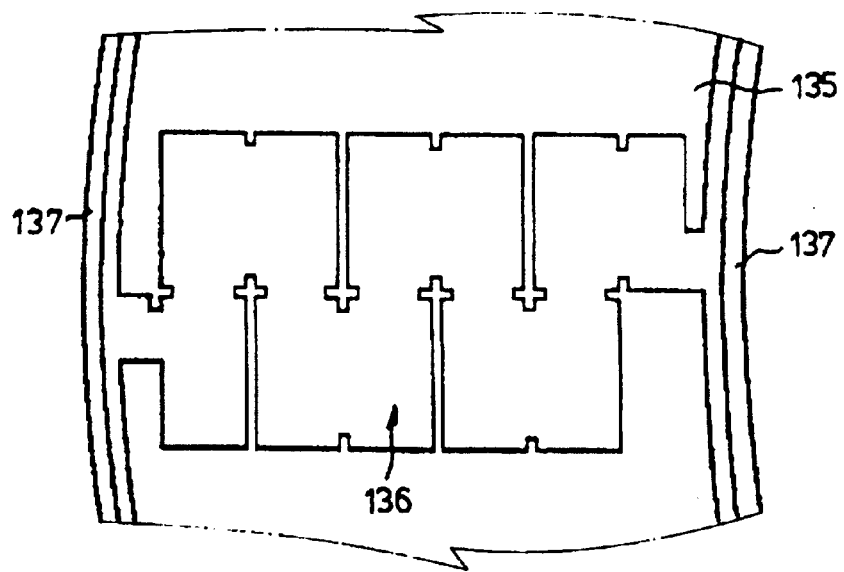
FIG. 14 is a partial plan view illustrating a fluid flowing path of one disc of the disc type column of FIG. 11.
Figure 14A:
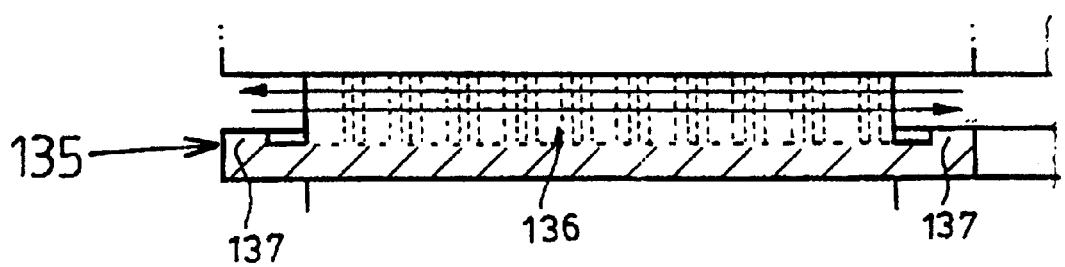
FIG. 14a is a partial sectional view illustrating an operational process of FIG. 14.

FIG. 14a shows a single disc 135 having a groove 136, angularly aligned with respect to the center of the other discs, where the rectangular section elbows having the orifice and the recess as shown in FIG. 12, are repeatedly arranged in the radial direction, and forming a protrusion 137 on the inner and outer sides of disc 135.

The shape, size and number of the fluid flow resistors are appropriately adjusted and determined in accordance with the velocity of the fluid and the pressure drop.

FIG. 14a shows the discs 135 as stacked, in which the fluid flowing direction is illustrated.

The fluid can flow from the disc outside to the disc inside, or reversely.

FIG. 15 shows various flowing patterns and the labyrinth function in the state where the fluid passes through the fluid flowing inlet 130 and outlet 131 of the discs, as seen in FIG. 13 when the upper disc 111 and the lower disc 112 which are machined in an appropriate depth are stacked in turn.

In more detail, the fluid flowing pattern to the fluid flowing inlet 130 and the fluid flowing outlet 131 of the disc as seen in FIG. 13 is formed from the upper disc 111 to the upper disc 112, from the upper disc 111 to the lower disc 111, the lower disc 112 to the upper disc 111, and the lower disc 112 to the lower disc 112, in accordance with the conditions of the fluid and the operating conditions of the valve 5.

The protrusion 115 in contact with the plug 7 is formed by rounded edge or a beveling as shown in FIGS. 15 and 15a, which prevents the fluid increment/decrement of the upper and lower discs 111 and 112 from being intermittent in accordance with the up and down movement of the plug 7, to smoothly control the fluid flow. Additionally, the narrow contact portion with the circumferential space thereof serves as the labyrinth part.

Figure 16:
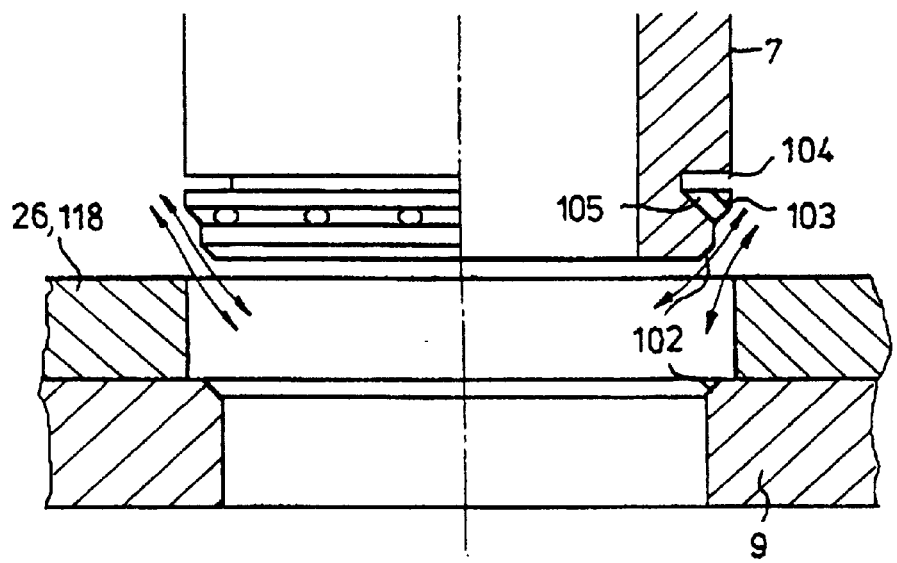
FIGS. 16, 16a, 16b, and 16c are partial sectional views illustrating the valve of FIG. 1, in which a function separation type plug and a seat are installed.
Figure 16A:
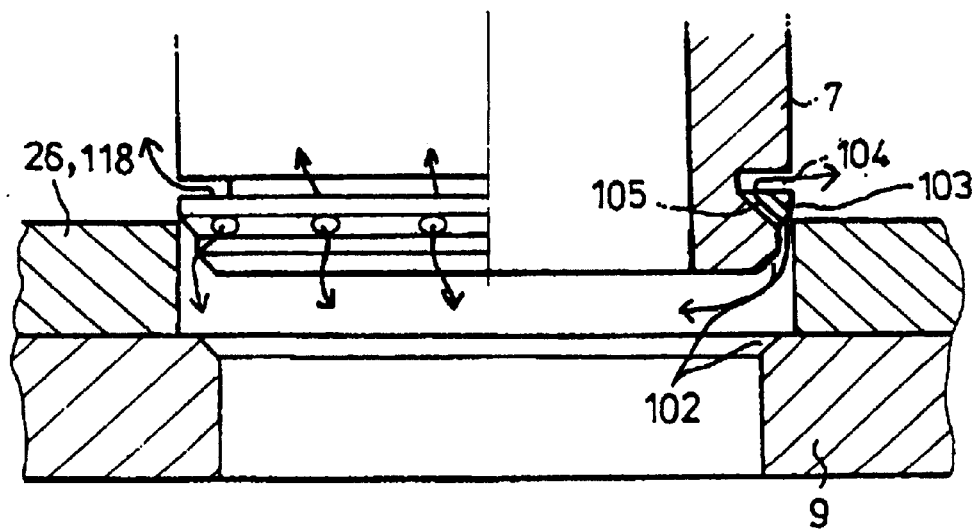
Figure 16B:
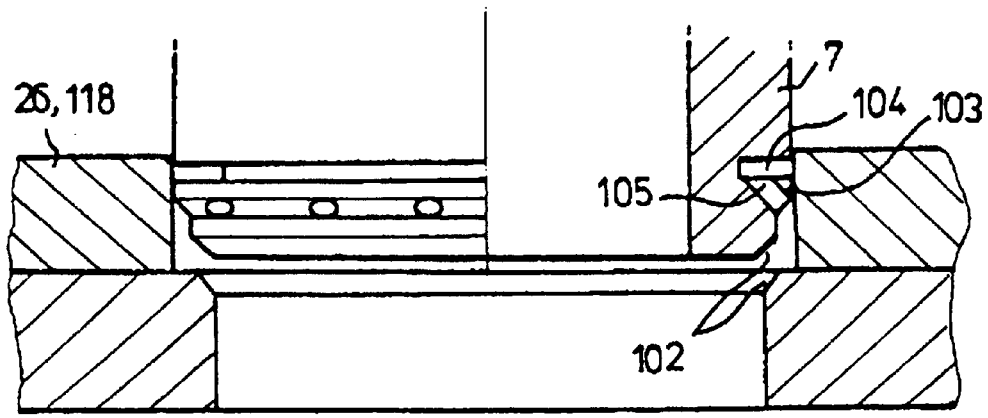
Figure 16C:
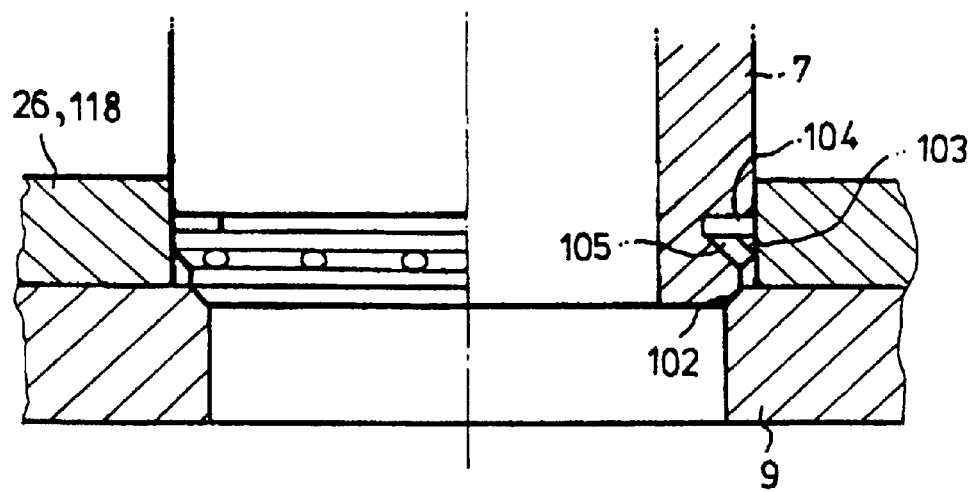

FIGS. 16a, 16b, 16c are partial sectional views illustrating the separating function of plug 7, the seat 9, and the supporting plate 26 or 118, in which the plug 7, which takes a rod shape, is made by cutting the bottom portion thereof to have a cylindrical shape.

For the separating function of the plug 7, the plug 7 is comprised of a sealing portion 102 which is in contact with the seat 9 and an opening/closing portion of the fluid flowing path of the fluid flowing resistor 4.

The sealing portion 102 has an edge with a predetermined angle or is rounded to be in a close contact with the seat 9.

The fluid flowing path opening/closing portion 103 forms a groove 104 on the upper surface thereof, through which a plurality of holes 105 for bypassing the fluid flowing path opening/closing portion 103 are formed to thereby perform the fluid flow dispersion to the fluid flowing path of opening/closing portion 103.

The circular holes 105 may be replaced with the longitudinal holes 52 as shown in FIG. 4.

The interval between the sealing portion 102 of the plug 7 to the seat 9 and the opening/closing portion 103 may be long, but it depends upon the distance thereof from the fluid flowing path of the fluid flowing resistor 4.

The plug 7 moves to the lower portion thereof from the inside of the fluid flowing resistor 4, and when the fluid flowing path opening/closing portion 103 is disposed in the vicinity of the fluid flowing path closing position, as shown in FIG. 16a, the fluid flows to the groove 104 on the upper portion of the opening/closing portion 103 and the holes 105, to thereby disperse the pressure operated on the opening/closing portion 103. As a result, no cavitation or damage is generated on the contact portion of the fluid flowing resistor 4 in the plug 7 and on the opening/closing portion 103.

Thereafter, the plug 7 moves further to the lower portion thereof. Before contacting with the sealing portion 102 of the seat 9, the opening/closing portion 103 closes the fluid flowing path of the fluid flowing resistor 4, as shown in FIG. 16b. Then, the plug 7 is in close contact with the sealing portion 102 of the seat 9, as shown in FIG. 16c, to completely close the fluid flow. To the contrary, if the plug 7 moves to the upper portion thereof in the state where the plug 7 has been in close contact with the seat 9, the sealing portion 102 of the seat 9 is firstly opened and the fluid flowing path of resistor 4 is then opened. As a result, when the fluid flows between the lower portion of the plug 7 and the seat 9, the velocity of fluid flow is not high on the sealing portion 102, to thereby prevent the damage of the sealing portion 102 of the plug 7 and the sealing portion 102 of the seat 9.

In this case, the seat 9 and the supporting plate 26 or 118 may be integrated with each other in consideration of the valve and fluid conditions.

Figure 17:
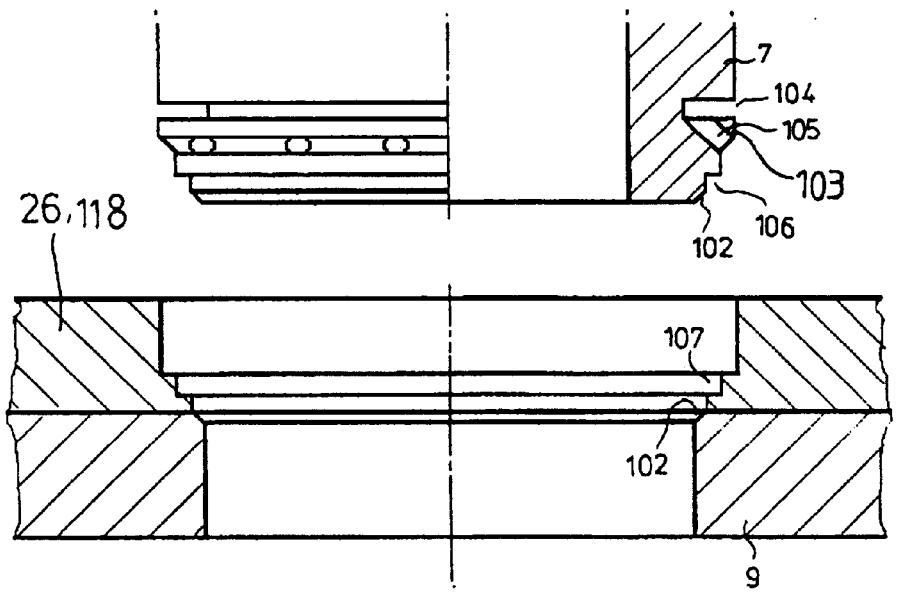
FIGS. 17 and 17a are partial section views illustrating the separating function of the plug and the seat of FIGS. 16, 16a and 16b on which protrusion and groove are respectively formed.
Figure 17A:
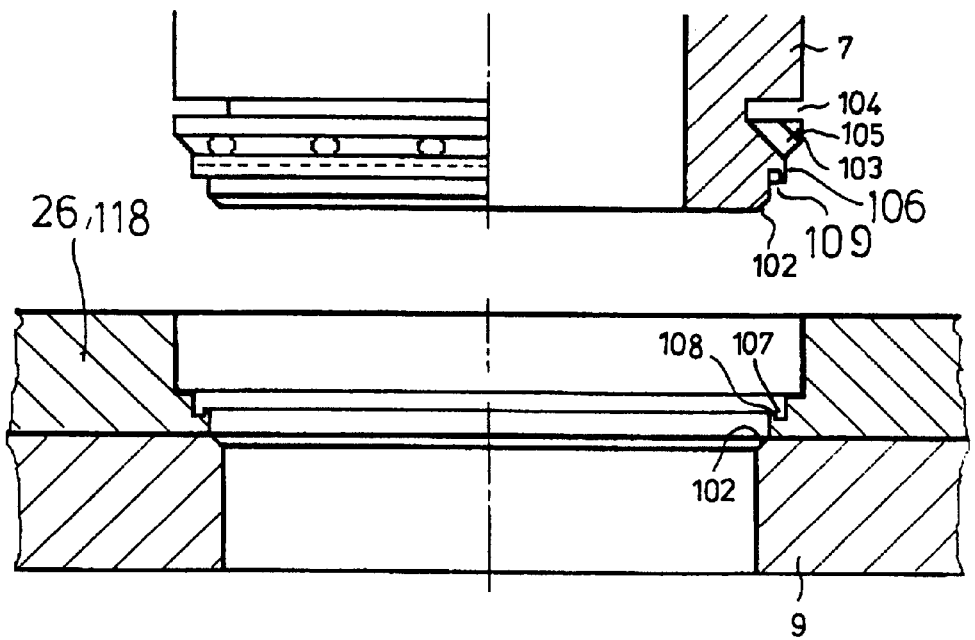

FIG. 17a is a partial sectional view illustrating a circumferential protrusion 106 between the opening/closing portion 103 and the sealing portion 102 of the plug 7. The plug 7 can be inserted on the upper portion of the sealing portion 102 of the seat 9, and the plug 7 forms a circumferential protrusion 107 corresponding to the protrusion 106 of the plug 7. Thus, before the sealing portion 102 of the seat 9 is in contact with the sealing portion 102 of the seat 9, a rectangular section elbow is formed to supply a predetermined resistance to the fluid flow, this preventing the damage of the fluid flowing path opening/closing portion 103 of the plug 7.

In other words, the mechanical damage and the fluid flow, which can be generated due to errors such as the manufacturing tolerance of the groove 104, the holes 105, the opening/closing portion 103, and the contacted parts with the plug 7, can be effectively prevented and adjusted. However, under more stable conditions, the mechanical damage can be prevented and the fluid flow can be desirably controlled only with the rectangular protrusion.

The protrusions 106 and 107 include of course additional protrusion in accordance with the fluid conditions, to thereby generate pressure drop by the multi-step procedure.

FIG. 17a is a partial sectional view illustrating a groove 108 formed on the protrusion 106 of the upper portion of the sealing portion 102 of plug 7 and the groove 108 formed on the protrusion 107 on the upper portion of the sealing portion 102 of the seat 9, to supply the predetermined resistance to the fluid flow through the multi-step rectangular section elbow. A plurality of protrusions having a groove can be formed as shown on FIG. 18. At this time, the height of the circumferential protrusion 107 on the uppermost portion of the sealing portion 102 should be higher than the height of the other lower side protrusions. As a result, the sealing portion 102 of the seat 9 along the movement of the plug is firstly separated from the plug 7, to thereby prevent the damage of the sealing portion 102 and perform a smooth fluid flow control.

Figure 18:
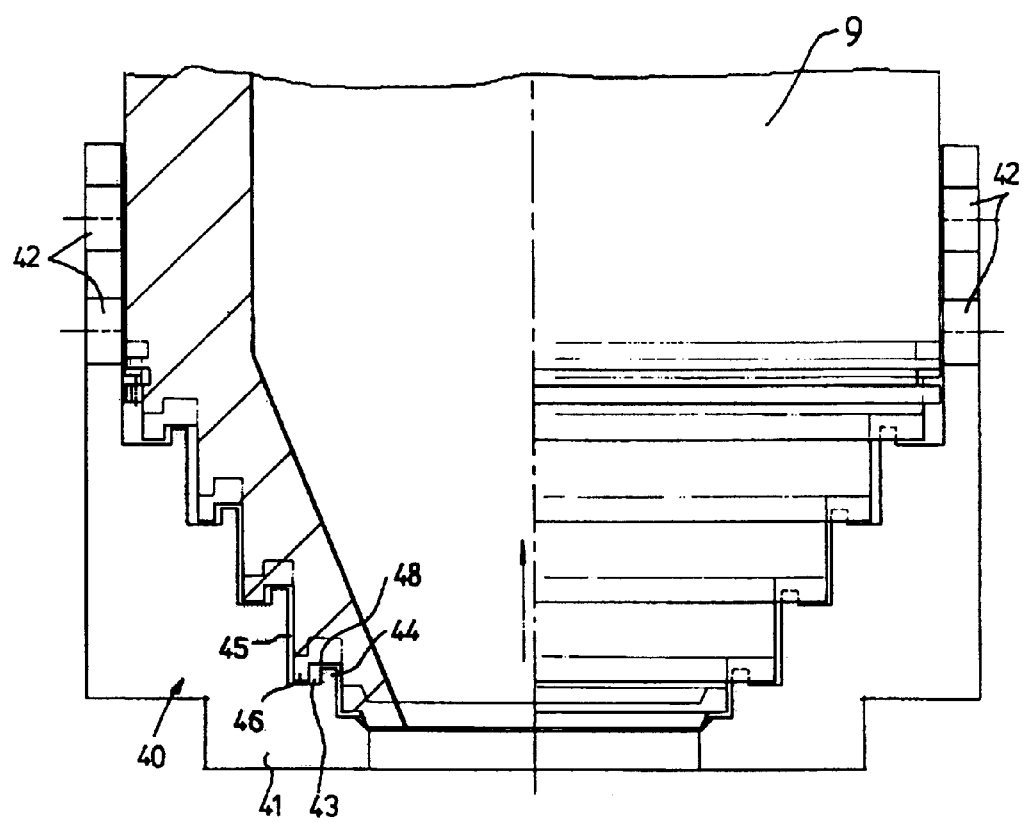
FIG. 18 is a partial sectional view illustrating a fluid flow control device of a valve according to a third embodiment of the present invention, where a fluid flowing resistor and seat are integrated with each other.

FIG. 18 is a partial sectional view illustrating a fluid flow control device of a valve according to a third embodiment of the present invention, where a fluid flowing resistor 40 and a seat 41 are integrated with each other, which takes a cylindrical shape and forms a plurality of holes 42 as fluid flowing paths a, a protruded groove 43 and a protrusion 44. The plug 7 forms a groove 48 and a protrusion 46 which are inserted to correspond with the protruded groove 43 and the protrusion 44, with clearance with 45 in the circumferential direction.

Of course, the seat 41 combined with the fluid flowing resistor 40 may be replaced with the cylindrical or disc shape of resistor 4, or it may be separately installed from the resistor 40. The shape of the fluid flowing path, that is, the hole 42 may be changed into the longitudinal hole 52, an inverted triangle and the like.

Under the above construction, if the two parts are in contact with each other, the sealing portions thereof are sealed. In this case if the plug 7 moves in the axial direction of the fluid flowing resistor 40, the grooves 43, 48 and the protrusions 44, 46 of the two parts form the fluid flowing path of the rectangular section elbow to thereby supply the velocity head loss for the fluid flow. As a result, the velocity of fluid flow is not accelerated and an amount of fluid flow can be increased, while having a constant velocity variation.

Particularly, the device of the third embodiment of the present invention can preserve the sealing portion thereof from the fluid flow, such that an additional seat is not needed. Moreover, in the state where the fluid flowing path is slightly opened, the number of resistant portion for the fluid is increased by steps. Also, as shown in a broken line, in the state where the two parts are considerably opened, the resistance operation of the rectangular section elbow is changed in the circumferential and axial directions to thereby perform more precise fluid flowing control.

The methods applied to the fluid flow control device of the present invention can be applied to a pressure reducing device and a back pressure reducing device, in the same manner as above.

Therefore, the fluid flow control device of the present invention can be used in all parts of the fluid control device for adjusting a predetermined amount of fluid flow.

Furthermore, the separating function of the plug may be applied in all fluid flowing control devices performing a fluid flowing closing operation, to thereby prevent the damage of the related parts to the plug.

INDUSTRIAL APPLICABILITY

As apparent from the foregoing, a fluid flowing control device of a valve of the present invention can control valve operation, fluid resistance back pressure and overall operations in connection with a mechanical technology used in the treatment for various kinds of fluids such as, for example, compressive fluid, non-compressive fluid and the like, and control the velocity of fluid by the maximal use of available volume thereof, to thereby prevent the generation of cavitation, flashing, blocking by foreign materials, and the damage of internal parts thereof. Moreover, a fluid flowing control device of a valve according to the present invention can generate large amount of velocity head loss in the connection with every resistor on a plurality of fluid flowing paths to increase a sectional area per the fluid flowing path on the constant pressure conditions applied to the valve, whereby the fluid flowing path is not blocked by the foreign materials passing through the valve to thereby increase an amount of the fluid flow within a predetermined volume thereof.

What is claimed is:

1. A fluid flow control device that comprises:
   (1) a valve body with a fluid inlet and outlet, and a flow path between the inlet and the outlet;
   (2) a plug movable in the flow path;
   (3) a flow resister within the flow path cooperating with the plug for reducing the pressure and noise of the fluid passing through the valve body, wherein the flow resister is defined by a plurality of labyrinthine passages comprising rectangular sectional elbows formed by protrusions in alternating wall members in the flow resister wherein the openings for fluid inlet and outlet are opposed to the protrusions to produce tortuous flow paths for the fluid passing through the resister; and
   (4) a seat for closing the fluid outlet when the plug is brought into contact with the seat.

2. A fluid flowing control device as claimed in claim 1, wherein said device comprises:
   (1) a flow resister cage having an inside cylinder, which is closely contacted with said plug and defines a plurality of holes and protrusions in radial directions, respectively, an outside cylinder which defines a plurality of holes in radial directions, a first internal cylinder which defines a plurality of grooves along an axial direction and a plurality of holes on said first internal cylinder, a second internal cylinder which defines a plurality of holes in radial directions, said first and second internal cylinders being thereby overlapped and inserted between said inside and outside cylinders in an alternating combination of said first and second internal cylinders, and forming a plurality of protrusions and grooves forming rectangular elbows, and upper and lower supporting plates for closely coupling said inside and outside cylinders with said first and second internal cylinders on the top and bottom ends of said cylinders;
   (2) the plug forming a sealing portion and an opening/closing portion when the plug is moved in contact with a seat, on the leading end of the lower portion of said plug and a plurality of holes bypassing said opening/closing portion through a groove on the top portion of said opening/closing portion, to thereby open/close said seat and control the fluid flow while being moved in the inside of said cage; and
   (3) the seat being in internal-contact with said plug.

3. The device of claim 2, wherein the cage having (i) a first internal cylinder which defines a plurality of grooves in the wall members of the cylinder, having concave and convex regions along an axial direction in the wall members defines a plurality of holes into concave regions, (ii) a second internal cylinder which defines wall members with an identical shape with said first internal cylinder but defines holes into convex regions, thereby being overlapped and inserted between said inside and outside cylinders in alternating combination of first and second cylinders.

4. The device of claim 2, wherein said cage comprises a first internal cylinder which defines a plurality of holes into the lower part of concave regions, a second internal cylinder which defines a plurality of holes into the upper part of said concave regions, adapted to be thereby overlapped and inserted between said inside and outside cylinders in alternating combination of said first and second cylinders.

5. The device of claim 2, wherein said cage comprises a first internal cylinder which forms concave and convex ridges on one side of a wall member along an axial direction and defines holes into the lower part of concave regions in the wall member, a second internal cylinder which defines an identical shape with said first internal cylinder in the wall member but defines holes into the upper part of the concave regions in the wall member, being thereby overlapped and inserted between said inside and outside cylinders in a linear combination of said first and second cylinder.

6. The device of claim 5, wherein said cage is devoid of a convex ridge against fluid flow.

7. The device of claim 2 wherein a first hole in the outside and inside cylinders into which the fluid flows is smaller than or equal to (i) a second hole of other cylinders and (ii) the side distance between the hole as a fluid flowing path of said other inside, outside and second internal cylinders and the groove of said first internal cylinder, and (iii) the size of the side distance of the rectangular section elbow path.

8. The device of claim 2, wherein said cage comprises said inside cylinder which is formed as an integrated body with said lower supporting plate and said outside cylinder as an integrated body with said upper supporting plate, being thereby coupled up and down with each other.

9. The device of claim 1, wherein said seat which defines a circumferential protrusion on the sealing portion of said seat, said plug having a circumferential groove on the upper portion of the protrusion of said sealing portion of said plug, thereby defines a stepped plug having a circumferential groove and protrusion between said seat and said plug.

10. A fluid flowing control device according to claim 9 comprising:
   a seat which has an integrated body with a fluid flowing cylindrical resistor, and a plurality of holes as a fluid flowing path and said seat defines a first protruded groove and a first protrusion in a multi-step manner; and
   said plug having a second protruded groove and a second protrusion which is inserted into said first protruded groove and said first protrusion of the seat, with clearance in a circumferential direction.

11. A fluid flowing control device according to claim 1, wherein said flow resister comprises a plurality of upper and lower discs being stacked up and down containing a plurality of first and second holes formed in a constant distance and aligned angularly with the center of said upper and lower discs, first and second protrusions in opposition to said first and second holes and each formed on the inside and outside of said lower discs, and a plurality of rectangular section elbows continuously formed by the arrangement of said first and second holes, each rectangular section elbow being defined by third and fourth protrusions on the inside rectangular portion thereof and opposing the holes in the discs, and fifth and sixth protrusions on the opposite of said third and fourth protrusions.

12. The device of claim 11, wherein said flow resister comprises a plurality of discs which are stacked, each having a groove where each of said rectangular section elbows has an orifice and recess in a constant distance and aligned angularly with the center of a disc and are repeated and first and second protrusions each are opposed to a hole formed on the inside and outside of a disc.

* * * * *